United States Patent
Ko

(10) Patent No.: US 7,656,898 B2
(45) Date of Patent: Feb. 2, 2010

(54) VIRTUAL CHANNEL REMAPPING

(75) Inventor: Kung-Ling Ko, Union City, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 928 days.

(21) Appl. No.: 10/667,081

(22) Filed: Sep. 18, 2003

(65) Prior Publication Data
US 2005/0063394 A1 Mar. 24, 2005

(51) Int. Cl.
*H04J 3/16* (2006.01)
(52) U.S. Cl. ...................................... 370/468
(58) Field of Classification Search ................. 370/229, 370/230, 254, 255, 329, 351, 360, 389, 396, 370/397, 398, 399, 395.2, 395.3, 395.31, 370/400, 401, 402, 431, 464, 386, 437
See application file for complete search history.

(56) References Cited

U.S. PATENT DOCUMENTS 6,167,051 A * 12/2000 Nagami et al. .............. 370/397
6,236,655 B1 * 5/2001 Caldara et al. .......... 370/395.31
2003/0026267 A1 * 2/2003 Oberman et al. ............ 370/397

* cited by examiner

*Primary Examiner*—Seema S Rao
*Assistant Examiner*—Mon Cheri S Davenport
(74) *Attorney, Agent, or Firm*—Conley Rose, P.C.

(57) ABSTRACT

Virtual channel enabled networking devices may map frames to specific virtual channels based upon frame characteristics (e.g. destination address, class of service). Devices and methods that provide a remapping of virtual channels are disclosed. In one embodiment, a network having virtual channel remapping may include: a first set of one or more switches that each support a first number of virtual channels, and a second set of one or more switches that each support a second number of virtual channels different from the first number of virtual channels. At least one switch from the second set is coupled to at least one switch from the first set and is configured to establish a correspondence ("map") between the virtual channels supported by the first set and the virtual channels supported by the second set.

36 Claims, 5 Drawing Sheets

FIG. 5

| VC_REMAP1 BIT(S) | FUNCTION |
|---|---|
| 63:60 | REMAP_VC_F: <br> The remapped VC when the calculated VC = 0xF. |
| 59:56 | REMAP_VC_E: <br> The remapped VC when the calculated VC = 0xE. |
| 55:52 | REMAP_VC_D: <br> The remapped VC when the calculated VC = 0xD. |
| 51:48 | REMAP_VC_C: <br> The remapped VC when the calculated VC = 0xC. |
| 47:44 | REMAP_VC_B: <br> The remapped VC when the calculated VC = 0xB. |
| 43:40 | REMAP_VC_A: <br> The remapped VC when the calculated VC = 0xA. |
| 39:36 | REMAP_VC_9: <br> The remapped VC when the calculated VC = 0x9. |
| 35:32 | REMAP_VC_8: <br> The remapped VC when the calculated VC = 0x8. |
| 31:28 | REMAP_VC_7: <br> The remapped VC when the calculated VC = 0x7. |
| 27:24 | REMAP_VC_6: <br> The remapped VC when the calculated VC = 0x6. |
| 23:20 | REMAP_VC_5: <br> The remapped VC when the calculated VC = 0x5. |
| 19:16 | REMAP_VC_4: <br> The remapped VC when the calculated VC = 0x4. |
| 15:12 | REMAP_VC_3: <br> The remapped VC when the calculated VC = 0x3. |
| 11:8 | REMAP_VC_2: <br> The remapped VC when the calculated VC = 0x2. |
| 7:4 | REMAP_VC_1: <br> The remapped VC when the calculated VC = 0x1. |
| 3:0 | REMAP_VC_0: <br> The remapped VC when the calculated VC = 0x0. |

FIG. 6

| VC_REMAP1 BIT(S) | FUNCTION |
|---|---|
| 63:60 | REMAP_VC_F: The remapped VC when the calculated VC = 0xF. |
| 59:56 | REMAP_VC_E: The remapped VC when the calculated VC = 0xE. |
| 55:52 | REMAP_VC_D: The remapped VC when the calculated VC = 0xD. |
| 51:48 | REMAP_VC_C: The remapped VC when the calculated VC = 0xC. |
| 47:44 | REMAP_VC_B: The remapped VC when the calculated VC = 0xB. |
| 43:40 | REMAP_VC_A: The remapped VC when the calculated VC = 0xA. |
| 39:36 | REMAP_VC_9: The remapped VC when the calculated VC = 0x9. |
| 35:32 | REMAP_VC_8: The remapped VC when the calculated VC = 0x8. |
| 31:28 | REMAP_VC_7: The remapped VC when the calculated VC = 0x7. |
| 27:24 | REMAP_VC_6: The remapped VC when the calculated VC = 0x6. |
| 23:20 | REMAP_VC_5: The remapped VC when the calculated VC = 0x5. |
| 19:16 | REMAP_VC_4: The remapped VC when the calculated VC = 0x4. |
| 15:12 | REMAP_VC_3: The remapped VC when the calculated VC = 0x3. |
| 11:8 | REMAP_VC_2: The remapped VC when the calculated VC = 0x2. |
| 7:4 | REMAP_VC_1: The remapped VC when the calculated VC = 0x1. |
| 3:0 | REMAP_VC_0: The remapped VC when the calculated VC = 0x0. |

VIRTUAL CHANNEL REMAPPING

BACKGROUND

Computer networks may facilitate communication by establishing links between nodes (e.g. computer, server, and stand-alone peripheral) of a network. These links may be physical or logical paths from a sender of a piece of information to its receiver. Each node of a network depends upon these links to communicate with other nodes. The information may be communicated in the form of data blocks, commonly referred to as frames.

Due to the growing number of nodes in networks, it is often impractical to directly connect every pair of sender-receiver nodes with a direct link. Consequently, many networks include switches for routing frames through shared intermediate links. Each switch may include multiple ports through which frames enter and exit the switch on network links. The switch is responsible for routing frames onto links which transport the frames closer to their destination. Each switch may be simultaneously routing frames from multiple nodes through multiple links of the network.

Each link has a limit to the rate at which frames may be transported. Since competing frames must share links, each switch includes a queuing scheme for frames directed to a given link. Unless the queuing scheme is carefully designed, it is possible for queues to overflow or for frames to be "blocked" in a queue indefinitely while the link is tied up. As can be appreciated, blocking and other conflict mechanisms may prevent data from flowing expeditiously through the network. The efficiency of the network may be measured in terms of the maximum data rate, or "throughput", and in terms of latency. Latency is the time it takes for data to travel from its source to its destination in the network.

To combat blocking and other degradations of network efficiency, virtual channels may be used. Virtual channels are independent logical links associated with a physical link.

FIG. 1 shows a simplified example of how the efficiency of a network without virtual channels may be decreased by blocking. In FIG. 1, two switches 102 and 104 are coupled by a link 106. Switch 102 includes a queue 108 for frames directed over link 106, and switch 104 includes a buffer 110 for frames received over link 106. Frames traveling from port A of switch 102 to Port E of switch 104 are labeled "E", while frames traveling from port B of switch 102 to port F of switch 104 are labeled "F". Frames of both types travel across the shared link 106.

Traffic congestion may prevent a switch (e.g., switch 104) from expeditiously sending a frame (e.g., an E frame) on to the next link. When this happens, buffer 110 may accumulate frames while the switch is waiting to forward the frame at the head of the buffer 110. If the buffer 110 fills, switch 104 may notify switch 102 to stop sending frames. In other words, the link becomes "blocked", not only for the frames targeted to a congested area (e.g., the E frames), but also for any other frames that happen to share the link (e.g., the F frames). During this blocking event, the link 106 is completely unused, which seriously degrades the measurements of network efficiency.

FIG. 2 shows a simplified example of how virtual channels may minimize the effects of blocking. In FIG. 2, the physical link 106 is treated as two logical (i.e., "virtual") links. The single queue 108 is replaced by two queues 112, 114, and the single buffer is replaced by two buffers 116, 118. The frames placed into queue 112 traverse link 106 to reach buffer 116, while the frames placed into queue 114 traverse link 106 to reach buffer 118. In normal operation, switch 102 will take turns sending frames from each queue. However, if congestion causes one of the buffers (e.g., buffer 116) to fill, switch 102 can stop sending from one queue (e.g., queue 112) and continue sending from the other queue (e.g., queue 114). Thus, link 106 continues to carry frames during a blocking event, thereby avoiding serious degradation of network efficiency measurements.

Today, switches and other network components (e.g. routers and hubs) use virtual channels to not only solve network efficiency problems, but also to ensure quality of service (QoS). QoS is the prioritization of network frames into groups that are given certain network characteristics (e.g. low latency or high bandwidth). These groups can be mapped, or assigned to virtual channels that are designed to provide the desired characteristics. For example, critical network message frames may be mapped to a virtual channel that has been given a higher priority. If other frames are competing for the same resources as critical network messages, the higher-priority frames may be given precedence over the competing frames rather than being forced to "wait their turn".

Of course, virtual channels will only be useful if multiple channels are used. Thus it becomes necessary to assign frames to different virtual channels. The mapping of frames to a virtual channel may be carried out by logic embedded in the switch. This logic may create a correspondence between certain frame characteristics and virtual channels. Each frame possessing the necessary characteristics may get mapped to a particular virtual channel.

Fibre Channel (FC) networks employ the virtual channel concept. A single FC link can carry data at rates exceeding 2 gigabits per second (Gb/s) in both directions simultaneously. Each link can use numerous virtual channels to prevent blocking and to ensure high throughput. The FC protocol provides a standardized frame structure for transporting the data.

Due to the increased importance and availability of virtual channel enabled networking devices, numerous compatibility issues have arisen stemming from the fact that devices with differing numbers of virtual channels cannot be easily connected. For example, some devices may use 16 or more virtual channels on a single physical link, while others may only use two virtual channels per physical link. In addition, even when the number of virtual channels is identical, some devices may use different virtual channel mapping protocols. In this case, identical frames may be mapped to different virtual channels across the devices, creating an incompatibility when the devices are directly linked. It would be desirable to eliminate these compatibility issues, thereby permitting networking devices to be interconnected with models that have different virtual channel characteristics.

SUMMARY

Virtual channel enabled networking devices may map frames to specific virtual channels based upon frame characteristics (e.g. destination address, class of service). Devices and methods that provide a remapping of virtual channels are disclosed. In one embodiment, a network having virtual channel remapping may include: a first set of one or more switches that each support a first number of virtual channels, and a second set of one or more switches that each support a second number of virtual channels different from the first number of virtual channels. At least one switch from the second set is coupled to at least one switch from the first set and is configured to establish a correspondence ("map") between the virtual channels supported by the first set and the virtual channels supported by the second set.

BRIEF DESCRIPTION OF THE DRAWINGS

A better understanding of the disclosed method can be obtained when the background and following detailed description of the preferred embodiment is considered in conjunction with the following drawings, in which:

FIGS. 5 and 6 show the layout of a remapping table in accordance with various embodiments of the invention.

Figure 1:
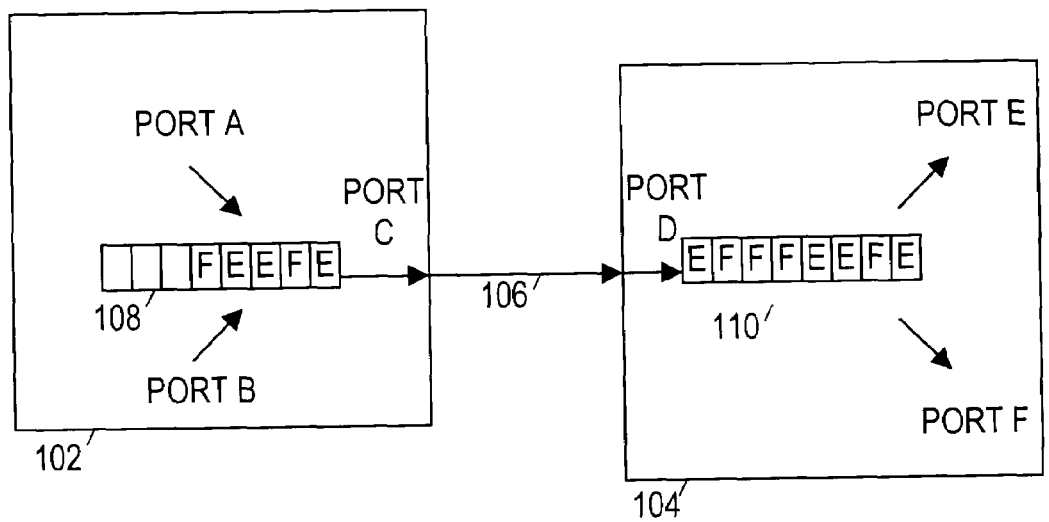
FIG. 1 shows an exemplary network without virtual channels.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

NOTATION AND NOMENCLATURE

Certain terms are used throughout the following description and claims to refer to particular components and systems. It is recognized that companies may refer to components by different names. This document does not intend to distinguish between components and systems that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

Figure 3:
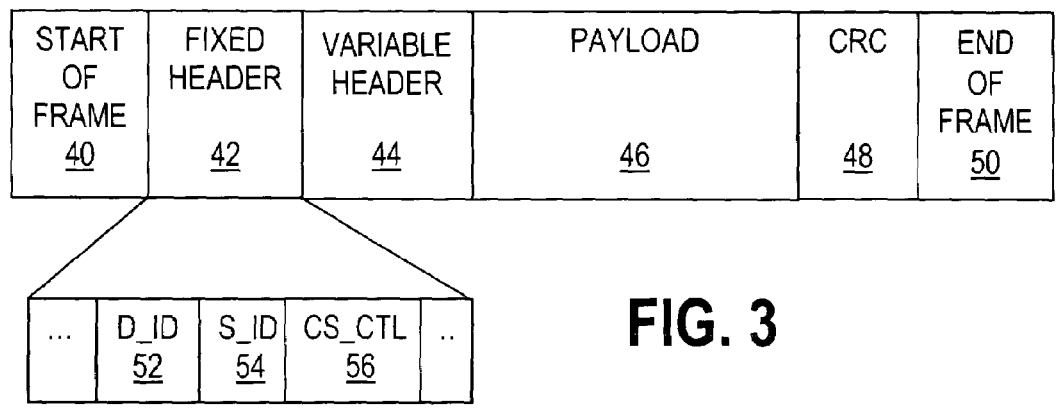
FIG. 3 shows a Fibre Channel frame format according to Fibre Channel standards.

FIG. 3 shows the layout of a typical Fibre Channel (FC) frame according to the Fibre Channel Frame and Signaling (FC-FS) specification. It includes the following six fields: start of frame 40, fixed header 42, variable header 44, payload 46, cyclic redundancy check 48 (CRC), and end of frame 50. The start of frame 40 is a sequence of four bytes used to achieve synchronization between switches. When a switch receives information from the transmitting switch, the receiving switch utilizes the start of frame field to identify the information that follows as a FC frame. The start of frame 40 also indicates the class of service the frame is utilizing.

Four classes of service may be available: Class 1, Class 2, Class 3, and Class F. Class 1 service may be used for information transfers needing dedicated, uninterrupted connections. Class 2 service may be used for transfers requiring an acknowledgement (ACK) of successful delivery of frames. Class 3 service may be used for transfers not requiring delivery verification. Lastly, class F service may be used for inter-switch communications.

Both Class 1 and 2 services support a one source to one destination, or "one-to-one" transfer mode called unicasting. Class 3 service may be used for transfers to many destinations, i.e., a "one-to-many" transfer mode called multicasting.

Referring still to FIG. 3, the next field in a FC frame is the fixed header 42. The fixed header 42 is a sequence of 24 bytes comprising a destination address field 52 (D_ID), a class specific control field 56 (CS_CTL), and a source address field 54 (S_ID). The destination address field 52 identifies the intended receiver of the frame, while the source address field 54 identifies the creator of the frame. The destination and source address fields may be used to determine the route a frame may take through the network. For example, when a switch receives a frame, it may use the destination address field 52 to determine the outgoing switch port for the frame.

The control field 56 in the fixed header may be used to send control options with a frame. The options may be specific to a frame's class of service. For example, a class 1 frame may request an acknowledgement from the destination switch by setting the corresponding option in the control field 56.

The variable header 44 and the payload 46 share an allocated space in a FC frame. The variable header 44 is an optional part of the FC frame standard that is used for particular frame types. It may vary in size up to 64 bytes to provide additional header fields as needed.

The payload 46 of the frame contains the information that is being carried in the frame. It may grow as large as 2,112 bytes if no variable header is included.

The Cyclic Redundancy Check (CRC) field 48 in a FC frame is a four byte error-detecting feature of the frame structure. If a frame becomes corrupted during transmission, the CRC field 48 may be used to determine if the frame needs to be retransmitted.

Finally, the end of frame field 50 is a sequence of four bytes. As the name suggests, this field is used to terminate a frame complying with the FC standard.

In order to control the flow of FC frames in a FC network, a switch or other networking device uses a credit flow control mechanism. This mechanism ensures that the buffers on a switch or other networking device do not get overrun with information. When a switch is ready to receive a frame, the switch issues a credit to the sender. The credits are used by the sender to track the number of additional frames that may be sent to the switch issuing the credit. The credit may come in two forms: end-to-end (EE) and buffer-to-buffer (BB).

EE credit may be used for class 1 and 2 levels of service. EE credit may indicate the number of frames that can be sent to a receiver switch without receiving an acknowledgement. Each time a device sends a frame, it decrements the EE credit associated with the destination of that frame. Each time the device receives an acknowledgment (ACK) frame from that destination, the device increments the EE credit associated with that destination. If the EE credit reaches zero and no acknowledgement is received, there may have been a buffer overrun or a transmission error. The sending switch may then try to negotiate another connection and retransmit the information.

BB credit may be used for class 2 and 3 levels of service. BB credit indicates the number of frames that can be received by a receiving device before that device's receive buffers become full. Each time a device sends a frame, the BB credit associated with the destination of that frame may be decremented. Each time a device receives a ready (RDY) frame from that destination, the device increments the BB credit associated with that destination. If the BB credit reaches zero and no ready frame is received, there may have been a buffer overrun. The sending switch may then try to renegotiate the credit and retransmit the information.

Figure 2:
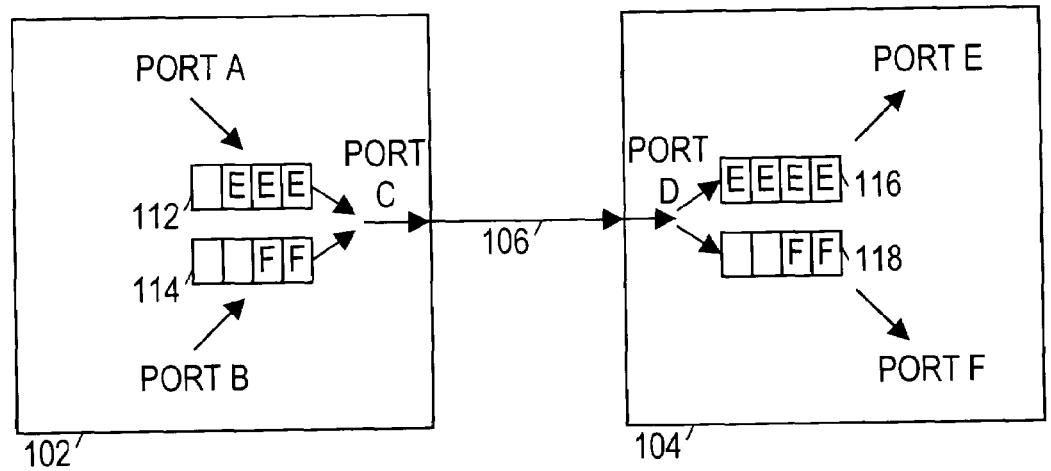
FIG. 2 shows an exemplary network configured with virtual channels.

Virtual channels may be used to increase the network's efficiency of transporting frames. As described previously with respect to FIG. 2, a physical link may be associated with multiple logical ("virtual") channels. Each frame that traverses a link may be associated with one of the virtual channels, and may accordingly be routed to a receive buffer associated with that virtual channel. (In actuality, a single receive buffer may be used, but understanding of the virtual channel concept may be aided by assuming that each virtual channel has a corresponding receive buffer.)

The sender of each frame may initially determine which virtual channel that the frame uses based on several considerations. In one network embodiment, the virtual channel selection may be based on frame characteristics such as the class of service and the destination address. As just one example, the virtual channels may be prioritized, with the highest-numbered virtual channel having priority over the lower-numbered virtual channels. In such an example, the Class F frames used for inter-switch communications may be assigned to the virtual channel having the highest priority due to the essential nature of such communications within the FC network. It is generally expected that response frames (e.g., frames that carry acknowledgement (ACK) messages and credit messages) will be sent on the same virtual channel as that associated with the triggering frames, though may not be required in all embodiments.

Any one of numerous methods may be employed to inform the receiver of a frame about the virtual channel associated with that frame. For example, a field may be included in the fixed header to indicate a virtual channel identifier. Alternatively, a time-division multiplexing scheme may be employed that automatically associates each frame with a virtual channel. Other methods are also contemplated and may be employed.

The foregoing description carries with it an underlying assumption that each of the switches in the network will support the same number of virtual channels. In networks having switches made by different manufacturers or even different generations of switches from a given manufacturer, this assumption may not hold true. In preferred network and switch embodiments, a virtual channel remapping functionality is provided to overcome any such virtual channel discrepancy.

A switch configured with this virtual channel remapping functionality may first determine the virtual channel mapping protocols of the other network devices to which it is connected. Using these virtual channel mapping protocols, the switch configured with the virtual channel remapping functionality is able to remap frames between different virtual channel mapping protocols, and is further able to carry out acknowledgement and credit transactions on the appropriate virtual channels. More specifically, when a switch receives a frame mapped in accordance with a first mapping protocol, the switch is able to remap the frame's virtual channel assignment in accordance with a second protocol, and is able to remap response frames from the second protocol back to the first protocol.

When a link is first established between two switches, both switches carry out an initialization or handshaking procedure. As part of this procedure, information identifying the manufacturer, model, and other characteristics of each switch may be exchanged. The information exchange may include some direct or indirect (e.g., the manufacturer name) indication of the number of virtual channels supported by each switch and the mapping protocol employed by each switch. In some embodiments, a switch having the virtual channel remapping functionality may determine that it is necessary to deceive the other switch in order to establish communications. For example, if an older switch refuses to communicate with a newer switch that supports a greater number of virtual channels, the newer switch may unilaterally re-initiate the connection and try to establish communications by claiming a virtual channel capability that is compatible with the older switch.

Figure 4:
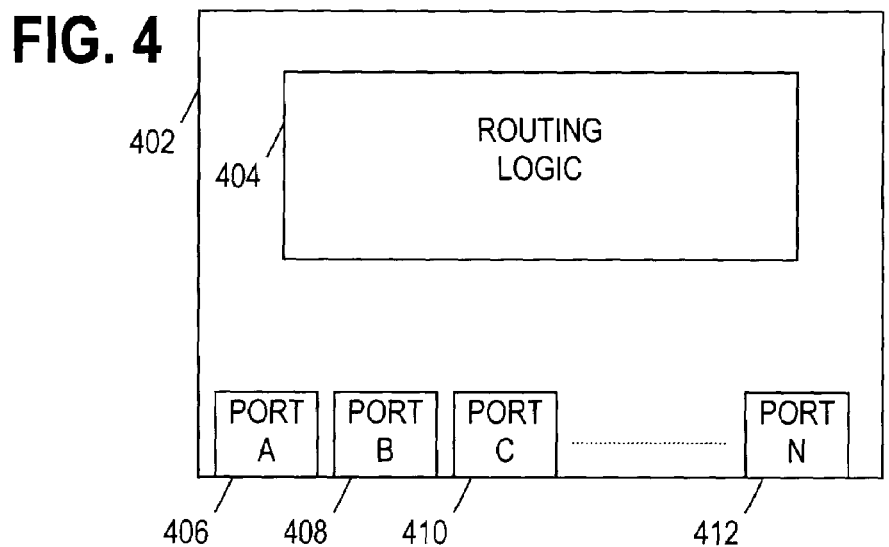
FIG. 4 shows a switch in accordance with preferred embodiments.

FIG. 4 illustrates switch 402 with remapping functionally in accordance with preferred embodiments. Switch 402 may comprise N ports, numbered 406, 408, 410, and 412. Each port may further be configured with a number of virtual channels. Switch 402 may also comprise routing logic 404 that is responsible for receiving incoming frames and utilizing a routing table to determine which port the frame may exit switch 402 upon. The port determined by routing logic 402 that a particular frame exits switch 404 on is herein referred to as the "exit port". Correspondingly, the port a frame enters switch 404 on is herein referred to as the "entry" port.

Each port in switch 402 may further comprise remapping logic (not explicitly shown) to carry out remapping functionality. This remapping logic may be responsible for determining the virtual channel protocol of the switch connected to the port. In addition, the remapping logic associated with each port may remap incoming and outgoing frames to ensure compatibility between the switches. For example, switch 402 with remapping functionality may accept an incoming frame from a connected switch that utilizes a particular protocol. The entry port for this frame may be Port 406. After reception of this frame, remapping logic in Port 406 may remap the frame to any protocol supported by the switch 402 with remapping functionality.

By default, the remapping logic may remap virtual channels to the protocol having the largest number of virtual channels supported by switch 402. Routing logic 404 then may examine frame characteristics to determine the exit port of the frame. For exemplary purposes, assume the exit port of a frame is Port 408. Once this exit port has been determined, the frame may be switched to the determined exit port. While at the exit port, in this case Port 408, the frame may be remapped by the remapping logic associated with Port 408 in accordance with protocol utilized by the device connected to Port 408. The protocol utilized by the device connected to Port 408 has preferably been stored in the remapping logic associated with Port 408 during an initialization procedure. This protocol comprises, at the minimum, the numbers of virtual channels utilized by the connected device.

In alternative embodiments, the switch with remapping functionality may change the default VC mapping protocol employed at its ports in accordance with connected switches. For example, if the device connected to the entry port of a switch with remapping functionality utilizes the same mapping protocol as the device connected to the exit port, the switch with remapping functionality may utilize this protocol for its own ports. Therefore, the frame may be sent through the switch with remapping functionality without any necessary remapping. For example, assume a switch that supports eight virtual channel is connected to Port 406 and a switch connected to Port 412 also utilizes eight virtual channels. When a frame enters switch 402 on Port 406 and exits on Port 412, only eight virtual channels may be employed on switch 402. Instead of utilizing all 16 virtual channels associated with switch 402, the remapping logic associated with both ports may request to utilize only 8 virtual channels. Therefore, no remapping is be required. The frame may exit switch 402 on the same virtual channel as it entered on.

FIG. 5 illustrates a first exemplary remapping table that is coupled to the remapping logic associated with each port in a switch with remapping functionality. This table may reside in a register, non-volatile memory, or other port accessible storage mechanism. This first remapping table is used to remap incoming transfers for a switch with remapping functionality that supports 16 virtual channels. The table comprises sixteen entries, one for each virtual channel. In addition, four bits are reserved for each virtual channel to store the remapped virtual channel number. For example, if the value <0100> (binary equivalent to 4) is written to bits <35:32> all incoming frames arriving on virtual channel 8 are remapped to virtual channel 4 of the switch with remapping functionality.

FIG. 6 illustrates a second exemplary remapping table that is coupled to the remapping logic associated with each port in a switch with remapping functionality. This table may reside in a register, non-volatile memory, or other port accessible storage mechanism. This second remapping table is used to remap outgoing transfers for a switch with remapping functionality that supports 16 virtual channels. The table comprises sixteen entries, one for each virtual channel. In addition, four bits are reserved for each virtual channel to store the remapped virtual channel number. For example, if the value <0011> (binary equivalent to 3) is written to bits <35:32> all outgoing frames leaving on virtual channel 8 of the switch with remapping functionality are remapped to virtual cannel 3 of the connected switch.

When a switch is connected to the switch with remapping functionality, the virtual channel mapping protocol is identified to the remapping logic associated with the port through the switch initialization procedure. The remapping logic utilizes this virtual channel protocol to write the proper information into the incoming and outgoing remapping tables in FIGS. 5 and 6. For example, consider the case when a first switch that supports eight virtual channels is connected to a second switch with remapping functionality that supports 16 virtual channels. Each frame may be mapped to a virtual channel by the first switch utilizing three bits. These three bits may place the frame into one of eight virtual channels. When the second switch receives the frame, it must utilize an additional bit to remap the frame into one of the 16 virtual channels. This additional bit preferably is identified automatically by the remapping logic associated with the port on the second switch based upon the virtual channel protocol received during the initialization procedure. Usually the most significant bit (MSB) or the least significant bit (LSB) of the destination address contained in the frame header is utilized. In alternative embodiments, the network administrator may manually configure the remapping logic to utilize defined bit(s) for remapping.

Once the first and second remapping tables preferably are written by the remapping logic, all frames that enter and exit the switch with remapping functionality may be remapped accordingly. Frames entering the switch with remapping functionality are remapped by remapping logic associated with the port they arrived on. This remapping logic utilizes the first remapping table in FIG. 5. In addition, credits and other outgoing transfers are remapped by remapping logic associated with the port they are being sent out on. This remapping logic utilizes the second remapping table in FIG. 6. Hence, the remapping tables are utilized for all incoming and outgoing transfers on the switch with remapping functionality.

The aggregate number of remapping tables associated with a switch configured with remapping functionality is determined by the number of ports utilized by the switch. For example, in a 16-port switch, each port will have one output remapping table, as shown in FIG. 6, and one input remapping table, as shown in FIG. 5. Thus, a total of 16 input remapping tables and 16 output remapping tables exist in the switch. Alternatively, specific ports may be configured with remapping functionality. Each port preferably possesses an output and input remapping register coupled to the remapping logic associated with the port.

In alternative embodiments, the remapping table in FIG. 5 and FIG. 6 may be manually written by a network administrator. This ensures that all possible virtual channel remapping combinations may be achieved. For example, a network administrator may desire to assign the high priority virtual channel (i.e. virtual channel 0) of a connected switch to the high priority virtual channel of the switch with remapping functionality. The remapping logic may not automatically create this remapping due to the bit that is utilizing to remap the virtual channels.

Figure 7:
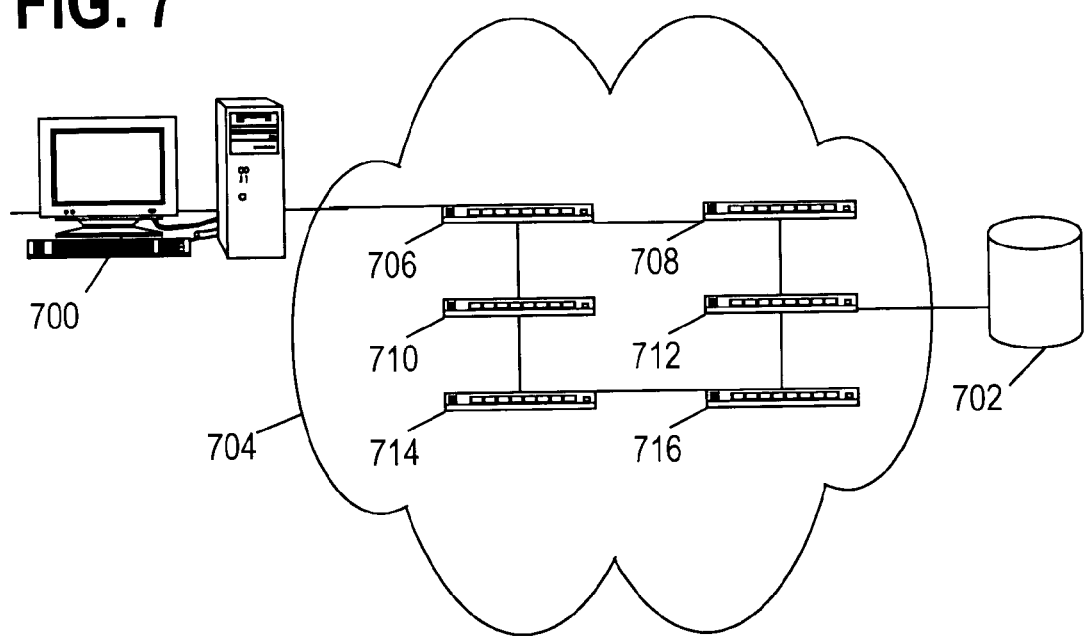

Although a Fibre Channel (FC) network was used in the preferred embodiment, the disclosed method may be equivalently implemented on numerous other types of network architectures. FIG. 7 shows a computer system 700 coupled to a storage device 702 by a network 704. The computer system 700 may be any suitable node device including a desktop computer, a server, or a user terminal. Storage device 702 may similarly be any suitable node device including a hard drive, RAID array, or network data store. Network 704 is shown having six switches 706, 708, 710, 712, 714, and 716 coupled together via inter-switch links (ISLs). The switches may have as few as four and as many as 256 or more ports. Some possible types of networks that may utilize the disclosed method are discussed below.

Synchronous Optical networks may employ a switch topology for optical communications. More information regarding Synchronous Optical standards may be found at www.iec.org/online/tutorials/sonet.

The disclosed methods may equally be implemented on token-passing networks. These networks move a small frame, called a token, around the network. Possession of the token may grant the right to transmit. If a node receiving the token has no information to send, it may pass the token to the next node of the network. Two types of token networks are Token Ring networks standardized in IEEE 802.5 and Fibre Distributed Data Interface (FDDI) networks, developed by the American National Standards Institute (ANSI) X3T9.5 standards committee.

Finally, Ethernet network standards may be found in IEEE 802.3, illustrating a commonly used switch-based topology again suitable for implementation of the disclosed method. Ethernet may be a local area network technology that transmits information between computers at speeds of 10 and 100 million bits per second (Mbps). Both versions of Ethernet technology may employ a similar switch based topology suitable for implementation of the disclosed invention.

Numerous variations and modifications will become apparent to those skilled in the art once the above disclosure is fully appreciated. It is intended that the following claims be interpreted to embrace all such variations and modifications.

What is claimed is:

1. A switch comprising:
   a first port for connection to a first external device and capable of transferring packets and operating using a plurality of virtual channels, wherein virtual channels designate logical subdivisions of a link and are not used for routing of packets;
   a second port for connection to a second external device and capable of transferring packets and operating using a plurality of virtual channels;
   switching logic connected to said first port and said second port for transferring packets between said first and second ports;

control logic coupled to said first port and said second port to configure said first port to operate using a first number of virtual channels and said second port to operate using a second number of virtual channels, wherein the first number is not equal to the second number; and remapping logic coupled to said first port, said second port and said switching logic, said remapping logic including and utilizing a table to remap the first number of virtual channels to the second number of virtual channels.

2. The switch of claim 1, wherein said table includes an incoming table to remap from the first number of virtual channels and an outgoing table to remap to the second number of virtual channels.

3. The switch of claim 1, wherein the control logic is configured to determine the first number based on data sent by the first external device and configured to determine the second number based on data sent by the second external device.

4. The switch of claim 1, wherein the control logic is configured to determine the first number and second number during initialization.

5. The switch of claim 1, wherein the switch is a Fibre Channel switch.

6. The switch of claim 5, wherein the first external device and the second external device are Fibre Channel switches.

7. A network comprising:
a first external device;
a second external device; and
a switch including:
a first port connected to said first external device and capable of transferring packets and operating using a plurality of virtual channels, wherein virtual channels designate logical subdivisions of a link and are not used for routing of packets;
a second port connected to said second external device and capable of transferring packets and operating using a plurality of virtual channels;
switching logic connected to said first port and said second port for transferring packets between said first and second ports;
control logic coupled to said first port and said second port to configure said first port to operate using a first number of virtual channels and said second port to operate using a second number of virtual channels, wherein the first number is not equal to the second number; and
remapping logic coupled to said first port, said second port and said switching logic, said remapping logic including and utilizing a table to remap the first number of virtual channels to the second number of virtual channels.

8. The network of claim 7, wherein said table includes an incoming table to remap from the first number of virtual channels and an outgoing table to remap to the second number of virtual channels.

9. The network of claim 7, wherein the control logic is configured to determine the first number based on data sent by the first external device and configured to determine the second number based on data sent by the second external device.

10. The network of claim 7, wherein the control logic is configured to determine the first number and second number during initialization.

11. The network of claim 7, wherein said switch is a Fibre Channel switch.

12. The network of claim 11, wherein said first external device and said second external device are Fibre Channel switches.

13. A method for operating a switch, the method comprising:
transferring packets at a first port for connection to a first external device and capable of operating using a plurality of virtual channels, wherein virtual channels designate logical subdivisions of a link and are not used for routing of packets;
transferring packets at a second port for connection to a second external device and capable of operating using a plurality of virtual channels;
transferring packets between the first port and the second port;
configuring the first port to operate using a first number of virtual channels and the second port to operate using a second number of virtual channels, wherein the first number is not equal to the second number; and
remapping the first number of virtual channels to the second number of virtual channels utilizing a table to perform the remapping.

14. The method of claim 13, wherein the table includes an incoming table to remap from the first number of virtual channels and an outgoing table to remap to the second number of virtual channels.

15. The method of claim 13, wherein the first number is determined based on data sent by the first external device and the second number is determined based on data sent by the second external device.

16. The method of claim 13, wherein the first number and second number are determined and the first and second ports are configured during initialization.

17. The method of claim 13, wherein the switch is a Fibre Channel switch.

18. The method of claim 17, wherein the first external device and the second external device are Fibre Channel switches.

19. A switch comprising:
a first port for connection to a first external device and capable of transferring packets and operating using a plurality of virtual channels, wherein virtual channels designate logical subdivisions of a link and are not used for routing of packets;
a second port for connection to a second external device and capable of transferring packets;
switching logic connected to said first port and said second port for transferring packets between said first and second ports and capable of operating using a plurality of virtual channels;
control logic coupled to said first port and said switching logic to configure said first port to operate using a first number of virtual channels and said switching logic to operate using a second number of virtual channels, wherein the first number is not equal to the second number; and
remapping logic coupled to said first port and said switching logic, said remapping logic including and utilizing a table to remap the first number of virtual channels to the second number of virtual channels.

20. The switch of claim 19, wherein said table includes an incoming table to remap from the first number of virtual channels and an outgoing table to remap to the second number of virtual channels.

21. The switch of claim 19, wherein the control logic is configured to determine the first number based on data sent by the first external device.

22. The switch of claim 19, wherein the control logic is configured to determine the first number during initialization.

23. The switch of claim 19, wherein the switch is a Fibre Channel switch.

24. The switch of claim 23, wherein the first external device and the second external device are Fibre Channel switches.

25. A network comprising:
a first external device;
a second external device; and
a switch including:
- a first port connected to said first external device and capable of transferring packets and operating using a plurality of virtual channels, wherein virtual channels designate logical subdivisions of a link and are not used for routing of packets;
- a second port connected to said second external device and capable of transferring packets;
- switching logic connected to said first port and said second port for transferring packets between said first and second ports and capable of operating using a plurality of virtual channels;
- control logic coupled to said first port and said switching logic to configure said first port to operate using a first number of virtual channels and said switching logic to operate using a second number of virtual channels, wherein the first number is not equal to the second number; and
- remapping logic coupled to said first port and said switching logic, said remapping logic including and utilizing a table to remap the first number of virtual channels to the second number of virtual channels.

26. The network of claim 25, wherein said table includes an incoming table to remap from the first number of virtual channels and an outgoing table to remap to the second number of virtual channels.

27. The network of claim 25, wherein the control logic is configured to determine the first number based on data sent by the first external device.

28. The network of claim 25, wherein the control logic is configured to determine the first number during initialization.

29. The network of claim 25, wherein said switch is a Fibre Channel switch.

30. The network of claim 29, wherein said first external device and said second external device are Fibre Channel switches.

31. A method for operating a switch, the method comprising:
- transferring frames at a first port for connection to a first external device and capable of operating using a plurality of virtual channels, wherein virtual channels designate logical subdivisions of a link and are not used for routing of packets;
- transferring frames at a second port for connection to a second external device;
- transferring frames between the first port and the second port and using a plurality of virtual channels;
- configuring the first port to operate using a first number of virtual channels and the transfer between the first and second port to operate using a second number of virtual channels, wherein the first number is not equal to the second number; and
- remapping the first number of virtual channels to the second number of virtual channels utilizing a table to perform the remapping.

32. The method of claim 31, wherein the table includes an incoming table to remap from the first number of virtual channels and an outgoing table to remap to the second number of virtual channels.

33. The method of claim 31, wherein the first number is determined based on data sent by the first external device.

34. The method of claim 31, wherein the first number is determined and the first port is configured during initialization.

35. The method of claim 31, wherein the switch is a Fibre Channel switch.

36. The method of claim 35, wherein the first external device and the second external device are Fibre Channel switches.

* * * * *

UNITED STATES PATENT AND TRADEMARK OFFICE
CERTIFICATE OF CORRECTION

PATENT NO. : 7,656,898 B2  Page 1 of 1
APPLICATION NO. : 10/667081
DATED : February 2, 2010
INVENTOR(S) : Kung-Ling Ko It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1253 days.

Signed and Sealed this

Thirtieth Day of November, 2010

David J. Kappos
*Director of the United States Patent and Trademark Office*